US005757597A

United States Patent [19]
Frank, Sr.

[11] Patent Number: 5,757,597
[45] **Date of Patent: *May 26, 1998**

[54] GROUND FAULT INTERRUPTER CONTAINER COMBINATION

[76] Inventor: William D. Frank, Sr., P.O. Box 81, Long Plains Rd., West Buxton, Me. 04093

[21] Appl. No.: 771,039

[ * ] Notice: The term of this patent shall not extend beyond the expiration date of Pat. No. 5,587,862.

[22] Filed: Dec. 20, 1996

Related U.S. Application Data

[63] Continuation-in-part of Ser. No. 501,943, Jul. 13, 1995, Pat. No. 5,587,862.

[51] Int. Cl.$^6$ .......... H02H 3/00
[52] U.S. Cl. .......... 361/42; 361/58; 362/431
[58] Field of Search .......... 361/42, 44, 45, 361/49, 50, 57, 58, 93, 1, 601, 625, 641, 673; 362/154, 191, 368, 378, 384, 413, 431, 450, 452, 457, 458, 155

[56] References Cited

U.S. PATENT DOCUMENTS

| | | | |
|---|---|---|---|
| 3,733,478 | 5/1973 | Barker | 362/387 |
| 3,753,047 | 8/1973 | Shallbetter | 174/60 |
| 3,872,354 | 3/1975 | Nestor et al. | 361/42 |
| 4,072,857 | 2/1978 | DeVicaris | 362/123 |
| 4,861,050 | 8/1989 | Bergeron | 280/47.35 |

*Primary Examiner*—Ronald W. Leja
*Attorney, Agent, or Firm*—Stan Jones, Patents

[57] ABSTRACT

A Ground Fault Interrupter ("GFI") combined with a plug-receiving receptacle is mounted in combination with a weathertight container. The container is additionally configured with a weathertight opening through which, a three prong male end of a pigtail from a remote power source is electrically connected to a GFI-protected receptacle. A weathertight lid covering for the container and weathertight rain shield for the container openings assures that the combination is functional during field use or for final storage for user transport of tools and other electrical apparatus. The device is optionally configured with a removable, storable, pedestal pole-mounted light assembly having GFI-protected wiring on the interior of the light pole which may be assembled in combination with the container.

20 Claims, 8 Drawing Sheets

GROUND FAULT INTERRUPTER CONTAINER COMBINATION

This application is a continuation-in-part of an application filed by the same inventor having Ser. No. 08/501,943 filed on Jul. 13, 1995 and now issued on Dec. 24, 1996 as U.S. Pat. No. 5,587,862. This application is timely filed before the patenting of the parent application.

BACKGROUND OF THE INVENTION

1. Field of the Invention

The field of invention includes electrical safety apparatus in combination with a container. More particularly, the field involves lighting apparatus, electrical power extensions, and electrical shock protection devices which are self-containerized for portability, safety and field use. Such devices, in accordance with this invention, are in compliance with most State and Federal Rules and Regulations including those of the Office of Safety and Health Administration ("OSHA").

2. Definition/Explanation of Terms

Ground Fault Interrupter (GFI).

The term Ground Fault Interrupter is a shortened version of the original, longer, more descriptive terminology, Ground Fault Circuit Interrupter (GFCI). Both terms and acronyms are used interchangeably. Such a device is electrically in series with a power source and any given portable tool which a user may plug into a female receptacle incorporated with GFI protection.

The purpose of the ground fault interrupter is to protect a user by preventing electrical shock from portable tools and power equipment. A GFI device performs its safety function by sensing minute stray currents (on the order of 4 to 6 milli-amps) which may be attempting to reach earth ground through a human body.

These very small initial currents flowing to ground and detected by the GFI, provide a near instantaneous circuit breaker which interrupts the primary electrical current from the power source. Such detection occurs within approximately 1/30th of a second before higher, more dangerous current levels can build up, thus preventing electrical shock, reducing fire hazards and creating a safer work place.

Receptacle

An electrical receptacle is one or more female receivers usually of the three prong variety. They are also normally configured in pairs or multiple ganged pairs. GFI circuitry which is electrically in series provides a GFI-protected receptacle. The configuration of this invention thereby creates a circuit interrupter/receptacle and GFI connection apparatus housed together with a container.

Self-Containment

A plastic containment assembly is a preferred form for self containing the electrical apparatus of the invention. Such container—in the containerized form of a caddy, tool box or the like—provides both a structural mounting apparatus for a GFI-protected receptacle and a weathertight housing which secures such electrical circuitry from false interruptions due to weather or other moisture. False power interruption from moisture is hazardous in and of itself on a construction/work site where power tools are in use.

External Source of Potential

In electrical terms, potential is defined as the potential to do work. It is the electrical potential above earth ground—usually measured in volts. For purposes of this self-contained invention the potential source, or primary source, is located externally, and the invention includes a safe, easy and OSHA accepted way of connecting to such a primary source.

Ground

Ground is defined electrically as zero potential and is used interchangeably with earth ground. Grounding is the act of connecting a device, wire or object electrically to a portion of a circuit which is then physically in contact with the earth usually through a conductive rod driven into the ground.

Weathertight Container

While the self-contained electrical apparatus of this invention is not absolutely waterproof in use, it is essentially so with normal care and usage. Thus, electrical apparatus, mounted in combination with an easy ingress/egress container, meets weathertight standards in that conventional hinged covers, lids, handles and sealable gaskets are provided for the electrical apparatus. Moreover, the container has easy ingress/egress and may readily be reclosed by a weathertight open/close lid for convenient daily use by a user. Various forms of handles for portability purposes are available.

3. Description of the Prior Art

As we have progressed in our technological development, we have created more uses for tools which require use of electricity at temporary sites. With this proliferation, concerns for electrical safety at the job site have dramatically increased. The first major thrust into this safety area was the U.S. Electrical code requirement of a separate, third ground wire for electrically supplied power.

The next, and still current addition in the safety area of prevention of electrical shock is that of a Ground Fault Interrupter (GFI). This GFI device has become an industry standard for electrical shock protection when using portable tools. GFIs are either in-line with plugs or are of a compact integral type with the receptacle being protected. GFI-protected safety has become so critical that such devices are mandated by OSHA.

GFI units are separately packaged devices between a primary power source and portable power tools. Although fine for shock protection, the nature of construction sites poses a major electrical hazard and housekeeping problem associated with GFI assemblies. Such assemblies, in the past, were thrown on the floor, tacked or tied to temporary construction members. And, in many instances, were susceptible to misuse, theft and damage.

Often, GFI units are dragged through, or left in, dangerous areas such as water puddles, thus endangering the lives and safety of workers. Many industrial sites, such as meat processing plants, butcher shops, etc., require an area to be "washed down" periodically during a working shift or at closing. Power sources and tools are present at such sites and weathertight containers solve a major safety problem.

Turning now to the prior art, a search has turned up various patents, many of which are only of peripheral relevance to this invention. Such patents include, for example, U.S. Pat. No. 3,872,354 (Nestor et al, 1975). Circuitry such as disclosed in Nestor et al is incorporated in today's commercial GFIs. Nestor discloses one typical technique and circuitry for a primary circuit interruption with fast response.

U.S. Pat. No. 4,709,980 (Coll et al; 1987) is of limited relevance to the present invention. The Coll et al disclosure is specifically engineered for cable splicing of joined, contained, and underground cables. It is not designed for repeated, daily use. Its purpose is to receive a properly spliced underground cable and permanently store the same. It is not relevant in structure or function to the invention.

U.S. Pat. No. 5,217,298 (Jackson et al., 1993) and U.S. Pat. No. 3,066,217 (McDonald, 1962) are lighting only container devices and are unrelated to the portability and safety features of my invention. They have no relation to OSHA requirements nor safety considerations for portable electrical equipment at job sites.

U.S. Pat. No. 4,984,685 (Douglas, 1991) suggests the use of a plastic container for storing and removing an electrical extension cord and cord light in a specific retrievable manner. While Douglas does show the usage of a container as a container for such storage it does not disclose the novel features of a ground fault interrupter and container combination, nor the combination of the container as both a mounting means and weathertight storage. Moreover, Douglas does not teach or suggest a container as a light base for a pole light partially housed in the container nor as a weathertight container for other tools which may safely be plugged into a container-mounted GFI-protected receptacle unit.

In the parent patent application, the Patent Office cited, as additional art, the following patents: Barker U.S. Pat. No. 3,733,478 issued on May 15, 1973; Bergeron U.S. Pat. No. 4,861,050 issued on Aug. 29, 1989; Brant U.S. Pat. No. 4,872,087 issued on Oct. 3, 1989; Shallbetter U.S. Pat. No. 3,753,047 issued on Aug. 14, 1973; and Pelletier U.S. Pat. No. 4,730,855 issued on Mar. 15, 1988.

These references do not teach or disclose job site GFI power related problems such as false triggering nor offer a solution to such problems. Indeed, it was successfully pointed out that such prior art, generally speaking, tends to increases this dangerous problem; and, in any event, such art would not and does not lead one of ordinary skill to the solution provided by the invention. The inventor has, in this invention, taught and claimed weathertight protection for the protection device itself, and has thus eliminated and solved false triggering problems which plague work sites.

OBJECTS OF THE INVENTION

It is an object of the invention to provide portable self-contained GFI protection to prevent electrical shock while using a receptacle mounted in or stored within a portable field use container for electrical supplies and electrically-powered tools.

It is an object of the invention to maintain a field-use GFI-protected/receptacle in an upright, stable position on a container which may readily be connected by a weathertight connection to an external power source.

It is an object of the invention to provide a safe and weathertight receptacle unit in series with the protection provided by a GFI device in combination with a portable weathertight container of various configurations.

It is an object of the invention to provide a weathertight self-contained electrical cord and GFI protection in a compact configuration which may lead to an externally located primary electrical source and provide safety for the user.

It is an object to provide an electrical cord for a weathertight GFI-protected or integral GFI/receptacle assembly in a self-contained, weathertight container both for protection and daily transportation of tools, etc. to and away from construction sites.

It is an object to provide an associated container for receiving electrical cords in combination with GFI-protected receptacle units so as to provide a user-friendly and safe storage for electrical tools and cords when not in use.

It is an object to provide portability of a self-contained circuit breaker, light fixture and other electrical tools or apparatus within a lightweight, easy-to-use weathertight container.

It is an object to provide an easy-carrying, self-contained combination for electrical protection circuitry and electrical tool capacity achieved within the container itself.

It is an object to provide a user installed portable pole light within a container for electrical circuit power connections for the light also safely mounted and portable by the same container.

It is an object to provide a means of creating a readily assembled extension method of removing a light and a mounting fixture from within a container, and affixing the light with safety-protected electrical circuitry provided by that same weathertight container.

It is an object of the invention to create a power extension device which may be connected to a primary source such that the extension and other associated electrical apparatus can be disconnected and stored in the container for easy portability and repeated daily usage.

It is an object of the invention to incorporate a weathertight seal when assembling a self-contained sectioned pole extension light having the electrical connections carried by the pole sections, which light is in combination with a GFI-protected receptacle in a weathertight container for a light/GFI-protected/receptacle combination.

It is an object of the invention to provide a readily replaceable attachment ring and a screw-on open/close lid on a standard plastic container in combination with electrical safety devices associated with electrical receptacle(s) mounted on the container and carried in combination therewith.

It is an object of the invention to secure weathertight openings in a sidewall container for electrical safety apparatus mounted on the sidewall of the container.

It is a further object of the invention to provide electrical outlet boxes and GFI/receptacle protection on a weathertight container that is safety-protected for portable field use.

It is an object to provide a stabilizing flange in the bottom of a weathertight container for anchoring an easily assembled light pole carried within the container and powered safely by electrical connections also carried by the container.

SUMMARY OF THE INVENTION

For purposes of this invention, a GFI/container assembly includes one or more electrical receptacles protected by an internal ground fault interrupter, and an industry standard electrical box with weathertight cover mounted on a container's supporting surface. Such an assembly has an insulated, sheathed electrical pigtail extension with one end electrically wired to a GFI-protected receptacle and the other unconnected end being is affixed with a male plug—normally of the male three prong type for connection to an external power supply.

One or more GFI-protected/receptacle assemblies, in accordance with good electrical safely practices, are rigidly mounted relative to the outside exterior of a container with a weathertight receptacle opening exposed at the exterior of the container. An intermediate protective system, of the invention, supplies power at job sites and includes a weathertight container for carrying tools, cords and the like to and from said job site; with electrical power for the intermediate system being provided via a power connection between the container and an external power source.

The invention provides a protective ground fault interrupter ("GFI") unit within and carried by the container and powered by the received electrical power. This GFI-protected/receptacle unit is subject to false power interruption when triggered by moisture. And weathertight protection afforded by the invention, protects the GFI-protected receptacle unit from such moisture, and thus guards against such false triggering.

The invention provides a pigtail type GFI assembly with a male plug normally temporarily stored inside the container for connection to a primary external source. That pigtail may readily be joined with such external power connection through another weathertight protective opening in the container. Thus, the weathertight power supply opening in the container allows the pigtail to be temporarily stored in the container away from inclement weather and water on a job site.

When a plastic pail is used as the container, the GFI and container combination solves several field problems in a number of ways. First, the container/GFI assembly configuration provides a safe and secure, permanent—but portable-mounting for the GFI/receptacle assembly. Secondly, it provides strain relief and safety for the pigtail portion of the assembly. Thirdly, it positions the receptacle face in a preferred, vertical configuration thereby orienting weathertight plugs and weather cap housings above the construction site floor during workmen's usage. Another orthogonally located rain cap provides entrance and egress for the male end of the GFI assembly so that the power may be provided to the container by its connection to a primary external power source.

Additionally, a sealable weathertight lid provides a simple, easily operable and weathertight covering for the container so that the combination is functional during field use of the invention. The container provides for final storage—or, for user transportation of tools- and an electrically safe portable power availability in the container which serves the dual functions of an easy way for transporting tools and power connections to and away from the job.

My device is optionally configured with a removable, storable, pedestal pole-mounted light assembly. A pedestal light support flange is securely and permanently attached to the interior base of the container. Container-sized pole sections substantially the same as, or slightly less than, the interior height of the container are available for assembling the light pole when needed by a user.

I have found, for example, that several light pole sections each with anti-seize rings can readily be stored within my container and then screwed together as needed for erecting a pole that will hold a light fixture for use on the job site. Such pole sections, somewhat in the manner of a flashlight housing, are provided with internal section-to-section connections such that the lamp may be energized by an electrical connection that is wired to a GFI-protected receptacle on the interior of the container. This lamp, when in use, complies with the State and Federal OSHA requirements because it is GFI-protected.

By making the light pole sections separate from each other, the erected pole is both strong and secure for an adjustable light of the type that is suitable for construction work. In particular, I have found that three to four individually-wired light pole sections provide a suitable height for a standard sized plastic pail or a common sized tool box. These sections place the light head at about three to four or so feet above the base surface. Such a height is particularly useful when working in early or late hours and may readily be assembled and disassembled as needed for day-to-day operations.

I have also found that conventional lamp heads for a pole lamp may be fitted with a unique keyed shape mounting fixture in order to let them fit into a mating key on the top of the pole while also making suitable electrical contact with the interior of the top pole section. In one preferred embodiment the key is selected with a "T" shape when viewed in cross section. The male end seats against a grounded plug bottom in a mating-shaped female socket in order to supply the requisite electrical contact.

BRIEF DESCRIPTION OF THE DRAWING

FIG. 14 includes FIGS. 14A and 14B wherein

DESCRIPTION OF PREFERRED EMBODIMENT (S)

Figure 1:
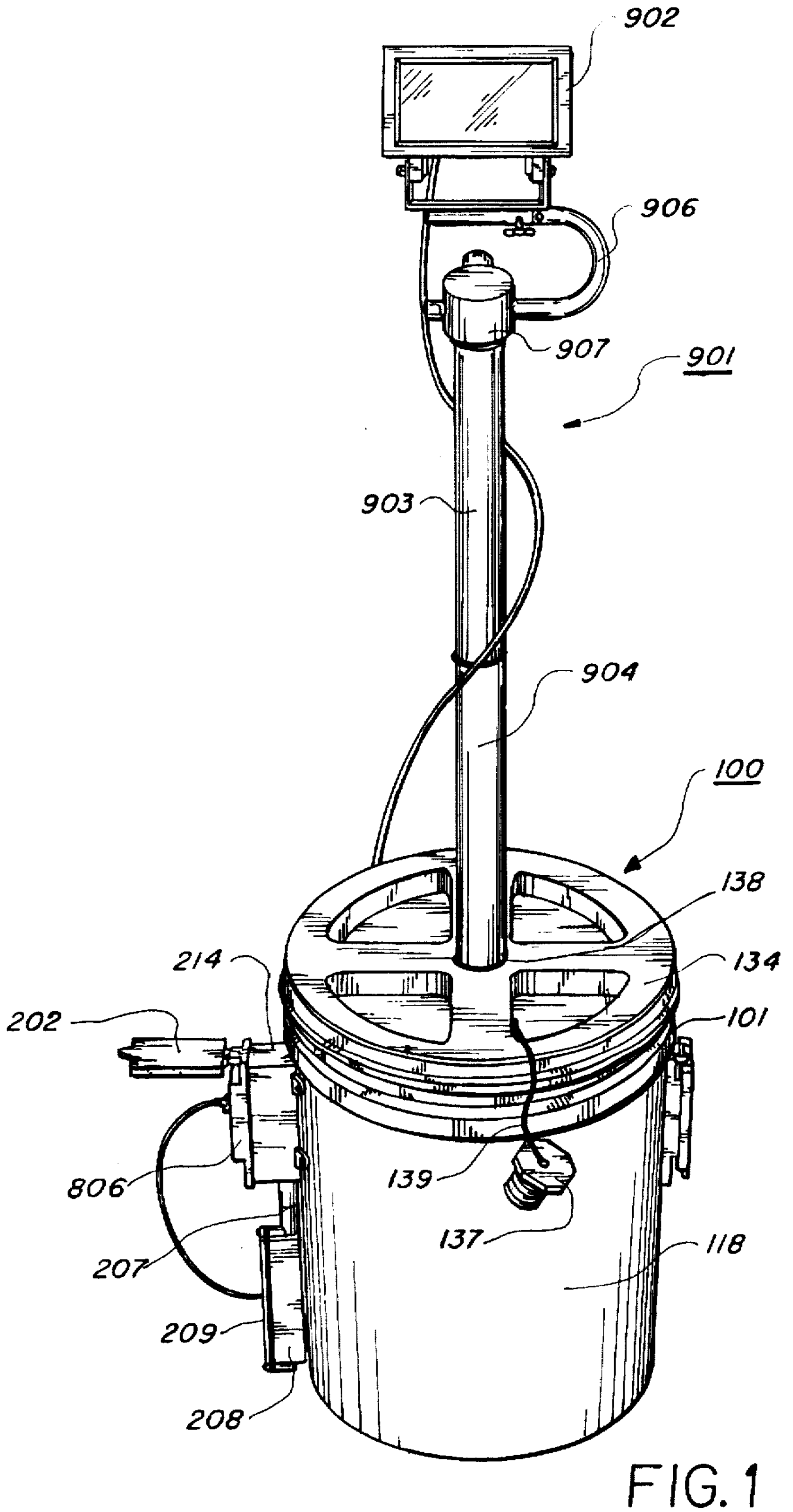
FIG. 1 is a front perspective view of the GFI/receptacle container combination depicting an optional light stand.
Figure 16A:
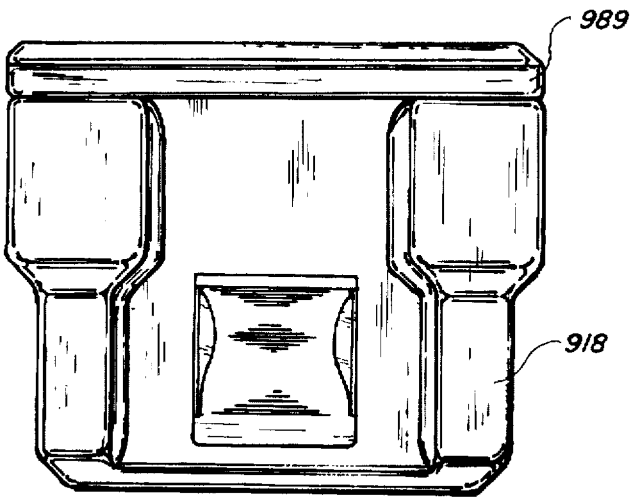
FIG. 16 includes FIGS. 16A and 16B which, respectively, are end and partial side views of a square or rectangular shaped container with rain shield covers.
Figure 16B:
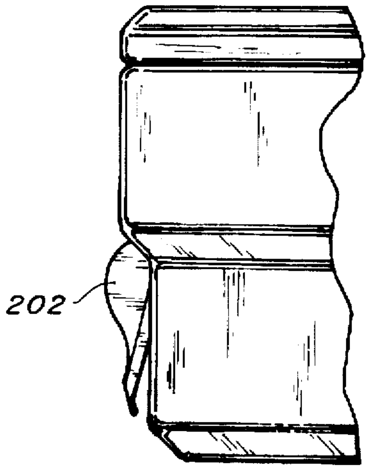

Turning now to FIG. 1, a perspective view of one embodiment of the invention is shown. The GFI intermediate power source combination 100 is comprised of a rigid plastic container 101 having a circular opening covered by an open/close lid 134. This top opening is normally in the order of 12 inches in diameter for most standard plastic five gallon pails. FIGS. 16 through 18 show that my invention is equally applicable to other shapes for the container 101 in that a rectangular tool box 1015 is similarly provided with my GFI-protected weathertight invention and pole lamp (FIG. 18).

Rigid plastic container 101, FIG. 1, is further comprised of continuous sidewalls 118 extending peripherally downward from the top opening covered by lid 134. The downward extension of the near vertical, circular sidewall 118 is in the range of 12 to 24 inches and terminates structurally with a closed bottom wall. Standard plastic containers are available in 3.5, 5 and 7 gallon sizes. Standard plastic tool or tackle type boxes are available in even larger sizes—some with wheels for hand portability when loaded with tools and construction lamps.

Rigid plastic container 101 is made weathertight at the top opening by a screw-in reusable, sealable lid 134. Although any number of lid configurations may be used, the one chosen for this application is a lid and ring combination designed specifically to fit the 12 inch diameter industry standard plastic containers of the 3.5, 5, and 7 gallon variety. Tool and tackle boxes, FIGS. 16 through 18 have both side and top handles. Top covers for boxes of the FIGS. 16 through 18 configuration are loose and readily removable while others are hinged normally along the rear of the box. Recessed handles in the hinged and latched top lid, FIG. 17, allow the lamp section opening to share the handle hinge area at a location in the top of a tool box which is already strongly re-enforced for the handle and handle hinge.

Positioned on the outer vertical sides 118 of container 101, FIG. 1, are various electrical housings, covers and conduits as required for the GFI/receptacle feature of the invention. For example, electrical box 214 surrounds and holds a GFI/receptacle unit. Electrical box 214 is typical of any number of such boxes which may be mounted on container 101. In keeping with U.S. Electrical Codes and guidelines, electrical box 214 is configured with a short conduit connector 207 exiting from the lower portion of electrical box 214. This conduit connector 207 protrudes downward and connects to a mating U.S. Code elbow access box 208 having a removable inspection cover 209.

Figure 2:
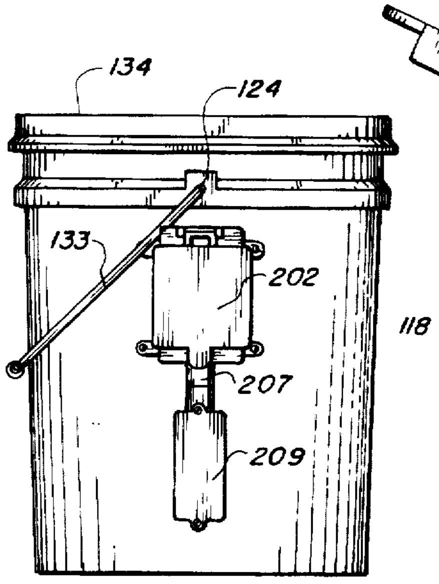
FIG. 2 is a front view of the GFI/receptacle container combination with a rain shield closed.
Figure 3:
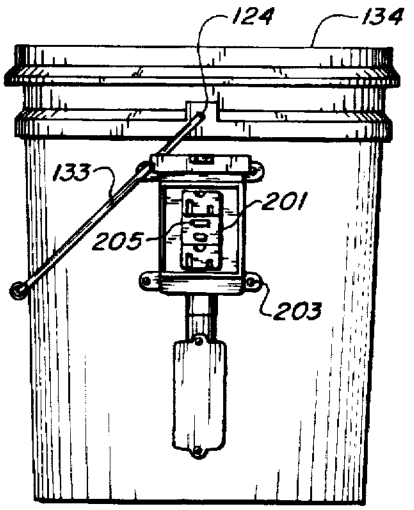
FIG. 3 is a front view with the GFI/receptacle rain shield open.

FIG. 1 also shows a rain shield 202 affixed to a cover 806, which cover is screwed into the face of electrical box 214. Shield 202 is hinged at the top to cover 806. Box 214, as shown in FIGS. 1, 2 and 3 houses the GFI/receptacle 201. This GFI/receptacle unit may be of the one or multiple receptacle configurations. FIG. 3 depicts a typical duplex receptacle 201 which may receive two separate male plugs in standard fashion.

GFI/receptacle 201, FIG. 3, is normally encapsulated in a synthetic plastic material. Both receptacle openings are protected by one GFI circuit 212, FIG. 4. The GFI circuit 212 is also normally encapsulated within the material that forms the duplex receptacle 201. Receptacle 201 additionally incorporates a circuit reset button 205. In the presence of a short or transient current, GFI 212 breaks the primary circuit in the manner described earlier. Once this condition is corrected, reset button 205, FIGS. 3 and 4, will restore electrical continuity for receptacle 201. Further, such industry standard GFI's also contain a test button 213 that allows a user to test the circuit breaking capability of the GFI.

GFI/receptacle 201 is mounted into and surrounded by a standard, weathertight electrical box 214. Box 214 is provided with mounting ears 203 containing pre-drilled or pre-cast mounting holes 204. Electrical box 214 is affixed to an upright sidewall 118 of container 101 with bolts 509 and nuts 510 through mounting holes drilled through the sidewalls 118 of container 101 at appropriate locations. Acorn nut-type fasteners provide a smooth non-snagging interior surface for the invention.

The location for mounting electrical box 214, FIG. 3, is such that its central vertical axis is beneath, but in line with handle mounting holes 124. These mounting holes may receive any standard handle 133. Additionally, box 214 is mounted a distance sufficiently below the mounting holes 124 so that the handle 133 clears the attached electrical box 214, when that cover is at rest. (Please note that the hinged rain shield 202 in FIG. 3 is toward the front and away from handle 133.)

Figure 4:
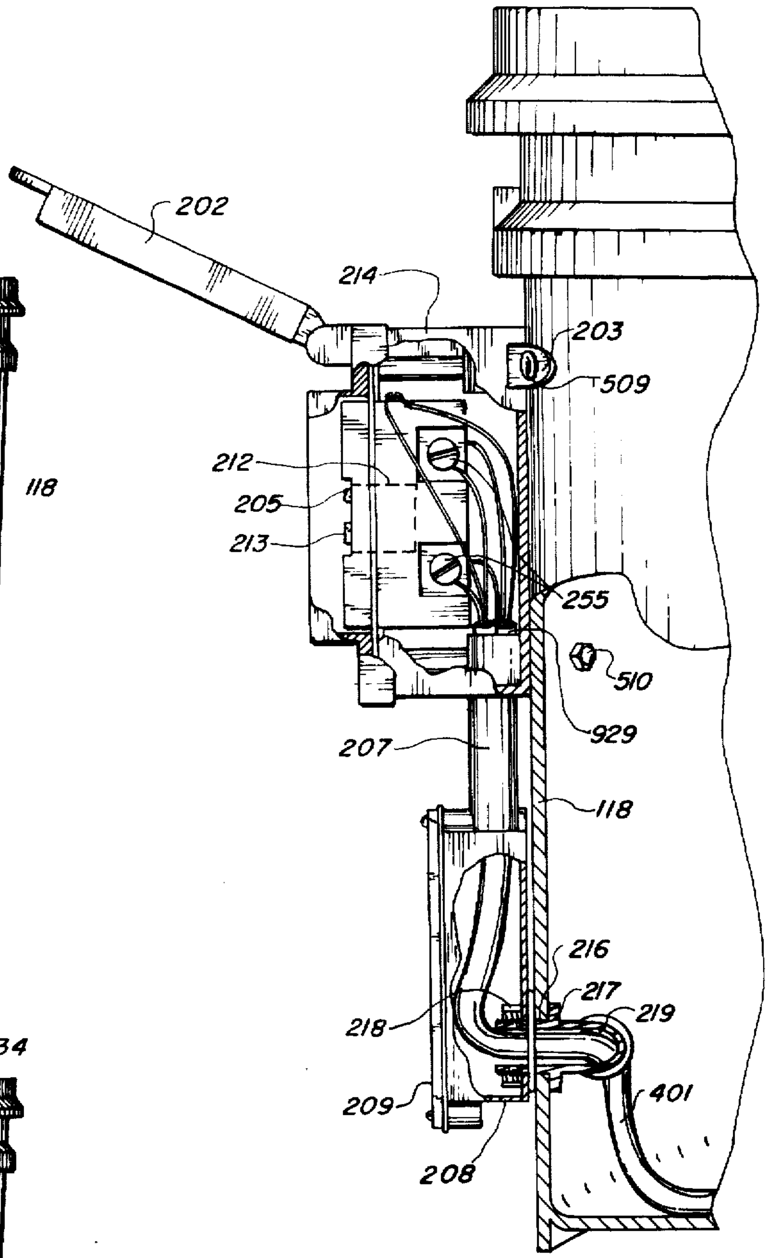
FIG. 4 is a partial cut-away side view of a receptacle/GFI unit of the invention.

The combination of box 214, conduit stub 207, and elbow access box 208 is shown in partial cross section in FIG. 4. These elements create a protective covering for a three conductor electrical wire 401. Wire 401 is optionally stored in container 101 and may have a standard three prong male plug 402, FIGS. 5 and 6, at one end and stripped wire terminals at the other end.

As shown in FIG. 4, near the bottom of container 101, a wire hole 216 is cut through sidewall 118. Positioned within hole 216 is an L-shaped conduit 219. Conduit 21 9 has an oversized flange and a threaded post section 217 that fits within opening 216. Flange 217 is positioned against the inside surface of sidewall 118 and the threaded post section extends beyond sidewall 118 through an opening in access elbow box 208. Box 208 is secured to the outside of container 101 by a backing nut 218. If additional weather tight connection is desired an O-ring may be used between the flange 217 and sidewall 118.

Elbow box 208 is configured with a removable inspection lid 209 for wiring access. During assembly, the stripped wire end of wire 401 is fed through elbow conduit 219, into elbow box 208 and upward through conduit stub 207 for electrical attachment at terminals provided on GFI/receptacle 201. For example, in FIG. 4 the stripped wire ends of wire 401 are shown connected by terminal screws at three separate connection points of receptacle 201 in accordance with standard wiring practice.

Figure 7:
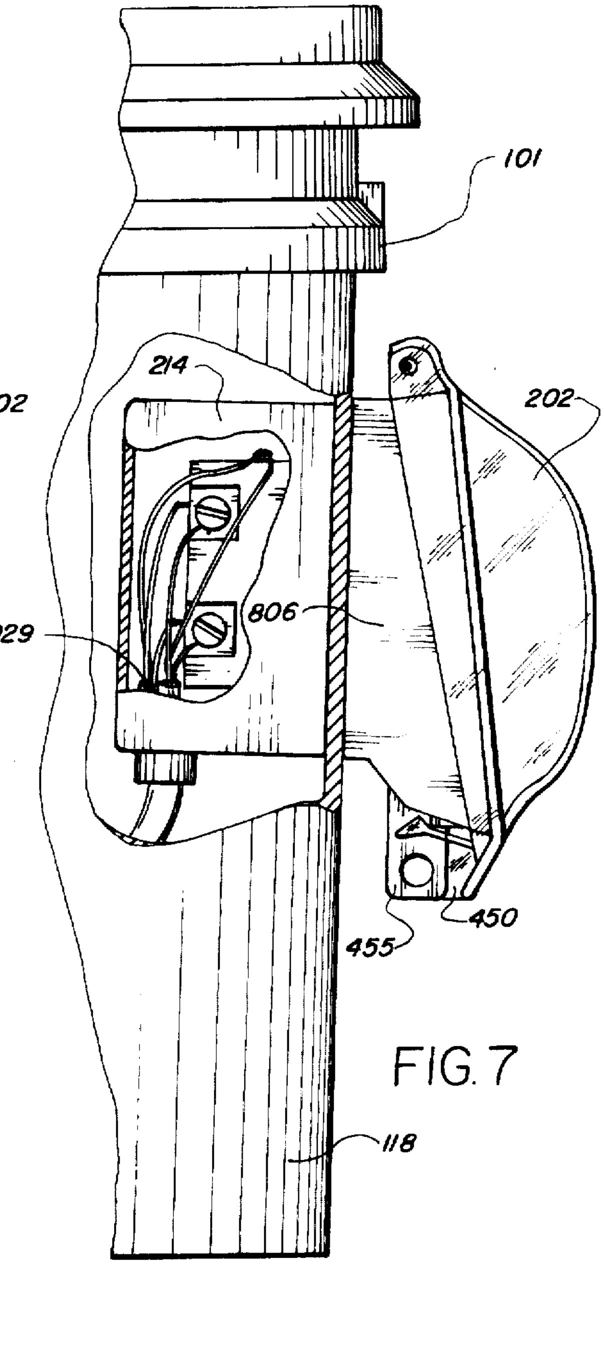
FIG. 7 is a partial side view of an alternative mounting embodiment for a GFI/receptacle unit of my invention.

It should be recognized at this point that box 214 may be of the type that has an opening in the top, bottom or rear side of the weathertight housing. One alternative method of mounting box 214 would be to do so within an enlarged opening cut through the sidewall 118 of the container 101 in order to receive the rearmost part of housing 214 within the interior of container 101. Such an alternative is shown in FIG. 7. The housing 214 may thus be mounted without an L-shaped elbow 219, conduit 207 or elbow box 208 as shown and described earlier. This form of mounting has the added advantage that it locates the center of gravity of the combination closer to the center of the container.

It is within the scope of this invention to mount the weathertight housing 214 completely inside the container, with the face of receptacle 201 exposed at the exterior surface of container 101 as shown in FIG. 7. In this alternative form of the invention, the receptacle face may still be covered by a rain shield 202 hinged at the exterior surface of the container. The rain shield 202 may be made of transparent or opaque material. If transparent rain shields are employed, the status of the test and reset buttons 205, 213 may be determined without lifting the rain shield.

Figure 8:
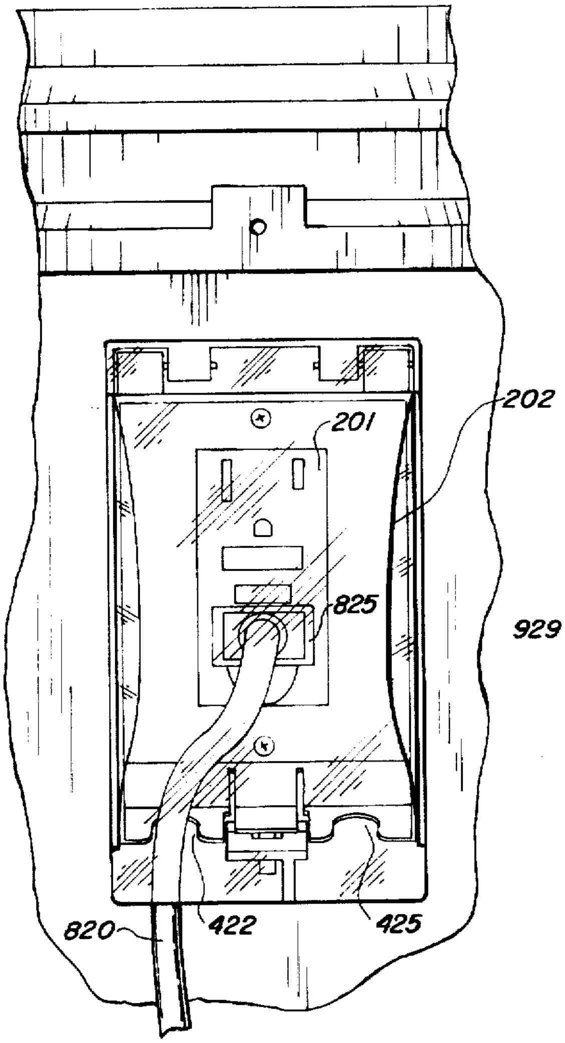
FIG. 8 is a partial front view of the alternative embodiment of FIG. 7 having a transparent rain shield with openings for electrical wiring.

Please note in FIG. 8, that the wire from a tool which has been connected to receptacle 201 may derive power from the invention of this alternative mounting form with an added advantage of improved shielding from water. For example, as shown in FIG. 8, a tool wire 820 equipped with a male plug 825 may be plugged into the receptacle 201 and the rain shield cover 202 closed over the wire and plug. The tool wire 820 may be removably seated in wire-receiving openings such as openings 422 and 425.

Figure 6:
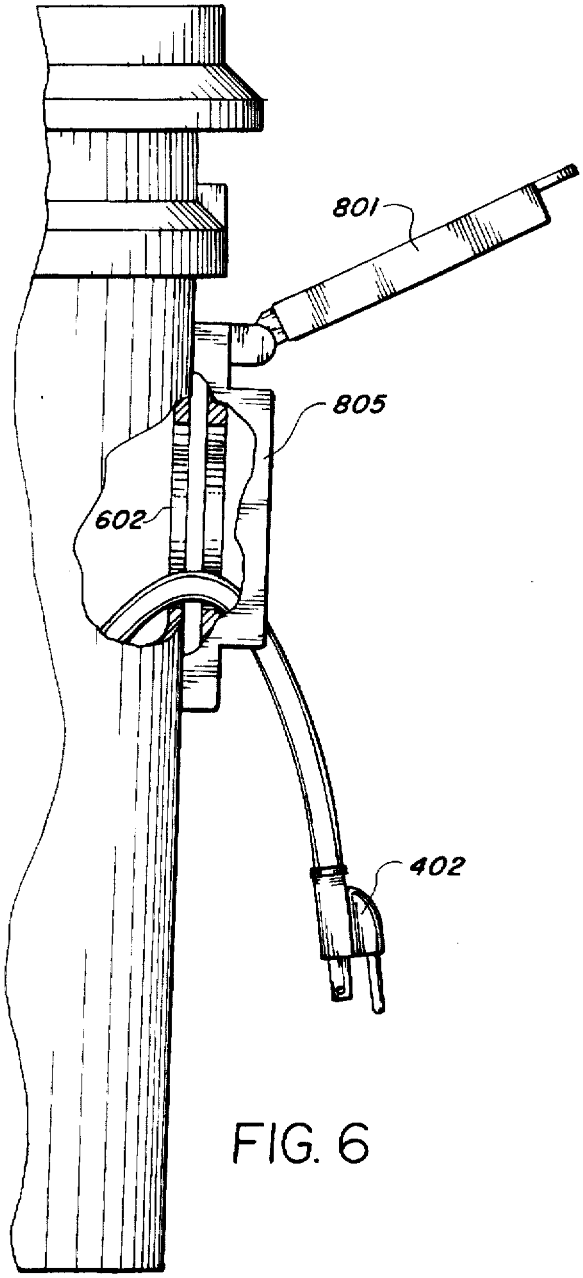
FIG. 6 is a partial cut-away side view of the weathertight opening of FIG. 5.

An overlapping pair of downward hasp extensions 450 and 455 are formed respectively in the lower part of housing cover 806 and rain shield 202, FIG. 8. Such hasp extensions may be provided with aligned openings for receiving a lock (not shown). The locking capability is of considerable interest for use of the invention around children. Also a locking cover and rain shield, as shown in FIGS. 7 and 8, may be used on the power opening side as shown in FIG. 6.

The receptacle portion may be separated from the GFI unit, but in-line and series connected electrically as shown for example in FIG. 18. In this FIG. 18 the rain covers reveal and protect a standard dual ganged electrical receptacle 201A which is normally encapsulated in a synthetic plastic material. Both receptacle openings are protected by one GFI circuit 212, FIG. 18. The circuit 212 is also normally encapsulated within the same or other plastic or insulator material that forms the duplex receptacle 201A.

In-line GFI 21 2, FIG. 1 8, additionally incorporates a circuit reset button 205A. In the presence of a short or transient current, GFI 212 breaks the primary circuit in the manner described earlier. Once this condition is corrected, reset button 205A, FIG. 18, will restore electrical continuity for receptacle 201A. Further, such industry standard GFI's also contain a test button 213A that allows a user to test the circuit breaking capability of the GFI. Often small lights are incorporated in the receptacle and/or GFI to show that the unit is being powered from the source. Such lights are an aid to trouble shooting.

As a further alternative, the plastic container itself may also have integrally molded sidewall protrusions in the container sidewalls. Such protrusions are appropriately sized to receive the GFI-protect/receptacle unit and/or the power opening cover unit. Such plastic protrusions are likewise fitted with hinged rain shield covers. Often locations are also available along the front and rear of the tool boxes of FIGS. 16 through 18 which will also readily receive my GFI-protected receptacles and weathertight rain shields.

Figure 5:
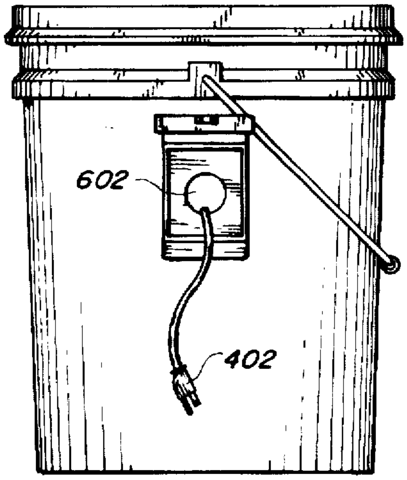
FIG. 5 is a back view showing an exit port with a rain shield open and a pigtail cord leading to an external power source.

FIGS. 5 and 6 depict a view of a three prong conductor wire 401 being of sufficient length to exit plastic container 101 through hole 602 for attachment to a primary electrical source (not shown). Opening 602, for additional protection, storage, and handling, is also configured with a modified rain shield 801 and housing 805 covering hole 602, and suitably fastened to container 101 with fasteners and acorn nuts as previously described.

Power opening 602, FIGS. 5 and 6, is larger in diameter than an industry standard male/female three prong plugged connection. This large diameter opening 602 allows the user to connect plug 215 to a primary power source or to another extension cord (shown in dashed lines in FIG. 7). In the latter case mentioned above, both cords so connected may be re-inserted through opening 602 and dropped into the interior of container 101 for weathertight protection of the plugged connection as shown in simplified form in FIG. 9.

Figure 10:
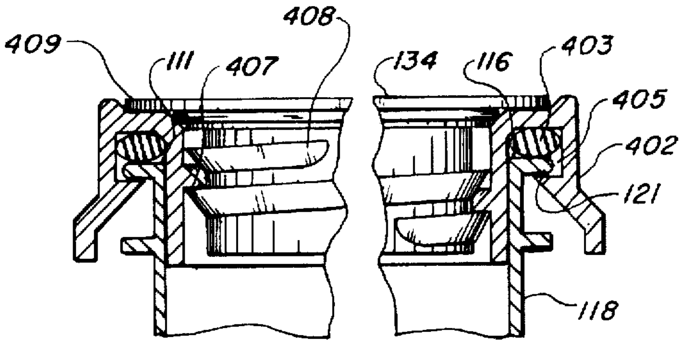
FIG. 10 is a partial cut-away of an open/close lid and assembly covering the top opening of the container.

Turning now to FIG. 10 an enlarged partial cutaway view shows a lid 134 covering the top opening 111 of container 101. Lid 134 is secured to container 101 through a threaded connection incorporating an after- market permanently attached ring 402. The under body of ring 402 is specifically molded with a peripherally continuous U-shaped internal groove 405. Groove 405 is of such width and cross-sectional shape so as to snap tightly over a corresponding reinforcing member 121 of rim 116, thereby compressing O-ring seal 403 tightly against the top 117 of rim 116 creating a watertight seal between the container 101 and connection ring 402.

Ring 402 is configured with molded raised, male threads 407, while lid 134 is configured with matching molded raised, female threads 408. Further, lid 134 has an over running lip 409 which acts as a stop when lid 134 is screwed into ring 402. Lip 409 in conjunction with ring 402 forms an open/close weathertight lid and container assembly.

For purposes of this invention the self-containment feature for an electrical/container combination of the invention, may include any one of several known weathertight lids. For example, a so-called "Gamma" patented plastic lid and ring assembly in accordance with U.S. Pat. No. 5,207,345 may be particularly useful as a top cover. Either new or used containers may be employed for the invention, and a Gamma or Gamma-type lid is a suitable replacement for the one-time shipping lid for plastic containers previously shipped with some form of containment.

Sealed shipping lids must be cut away in order to access the contents of the containers used for such shipping. Generally speaking such a lid is a one time, for shipping purposes only, containment lid. The container itself, of course, is not harmed and thus is a continually useful device that most users have in their home, business or work place. Such containers, affixed with my GFI/receptacle invention, serve a new and novel purpose not heretofore realized by the art. In any event, the purpose of the lid and ring assembly is to provide a weathertight reusable lid covering the top opening 111 of container 101.

Returning briefly to FIG. 1 another feature of my invention is shown for providing a portable light and GFI/receptacle connection for standard 120 volt operation. This portable light feature, is provided by light 901 which is plugged into the exterior face of the GFI/receptacle 201. Such a light, supplied with my GFI/receptacle protection, thus complies with OSHA requirements.

Figure 9:
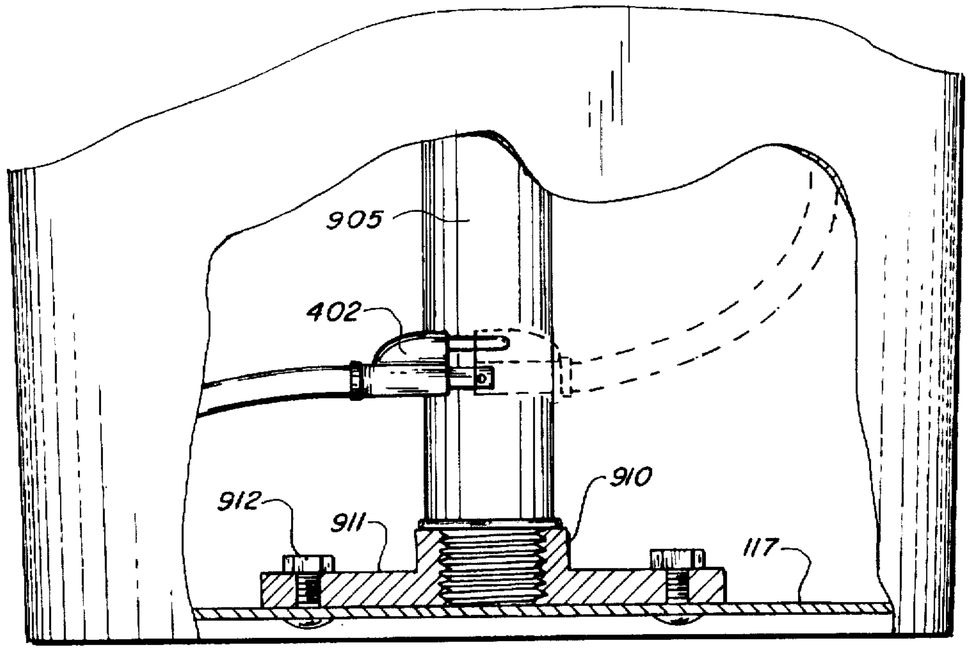
FIG. 9 is a partial cut-away of a light flange in the bottom of the container.

As shown in FIG. 9, pole section 905 extends to the bottom of container 101 through a hole in lid 134, FIG. 1. Placed in the bottom of container 101, is a pedestal flange 910, FIG. 9, which flange is secured to bottom 117 of container 101 with carriage bolts 911 and nuts 912. Of course, this pedestal light support flange 910 may be securely attached to the bottom 117 of the container by any other suitable means or it may be molded directly into the container itself. Likewise such a flange may be incorporated in the containers of FIGS. 16 through 18.

The first pole extension 905 at its upper end is configured with an O-ring seals to seal the point 138 at which the first pole section 905 exits the lid to join with a second section 904. Sectioned pole light 901 may be carried in a disassembled condition to the job site in container 101 and then assembled as needed at the site.

The various light components may include a light pole made up of three to five interchangeable pole sections of equal length. The length for each section is chosen to fit within the container so that they are easily disassembled or reassembled at the job site as needed. For the tool box configurations of my FIGS. 16 through 18, the pole sections may be of longer length and still protrude through an opening in a weathertight lid.

Sealable lid 134 is further configured with sealable screw plug 137. Screw plug 137 is attached to the sealable lid 134 with a linking chain 139. This cap 137 seals the center opening 138 in lid 134 when the pole is disassembled for weathertight storage and portability. When light pole 905 is not in use, screw plug 137 is secured in lid 134 such that the entire GFI combination 100 retains its watertight integrity. Such a sealable plug is also available for the tool box configurations of FIGS. 16 through 18.

The pole sections 903, 904 and 905 may be made of PVC piping and are each adapted with threaded fittings that screw together to make a light extension/mounting pole 905. O-rings separate each section and provide a cushion for both secure mounting purposes and to prevent the PVC pipe sections from binding against themselves when the sections are threaded together.

Figure 11:
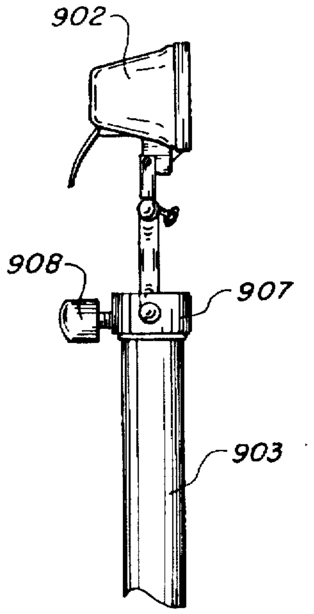
FIG. 11 is side view showing a pole extension and light bracket assembly.

Included at the upper end of longitudinal pole 903 is a top cap 907, which cap has a transverse opening therethrough for slidably receiving a C-shaped light bracket 906. Bracket 906 holds a light 902 on one side of the C-shape, while the other side of bracket 906 slides through the opening in top cap 907. Bracket 906 may be adjusted as desired for lighting angles and then held in place by a threaded screw-down tightening knob 908, FIG. 11.

Tightening knob 908 and the C-shaped bracket 906 allow a user considerable freedom for adjusting the lighting position for light 902. Similarly the number of sections for my light pole can be selected for any desired light height. While light 902, as shown, is of a commercially available argon type, it is obvious that any suitable light may be employed without departing from the spirit of my claimed invention.

Light pole section 903 also provides a secondary benefit in that it can serve as a secondary grasping handle ("grab pole") for moving the GFI/receptacle/light/container combination. As a result of balance and clearance considerations, standard container handle 133 may be less than optimal when light 902 is installed. Experience has shown, however, that the assembled pole easily serves as a handle for moving light 902 as desired at the job site.

Figure 12A:
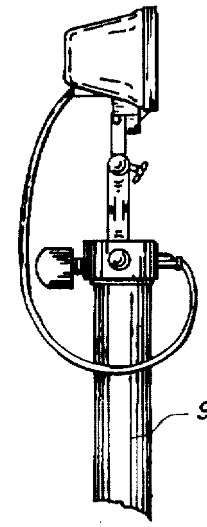
FIG. 12 includes FIGS. 12A, 12B and 12C which respectively are additional views of a light head mounting assembly having alternative power connections.
Figure 12B:
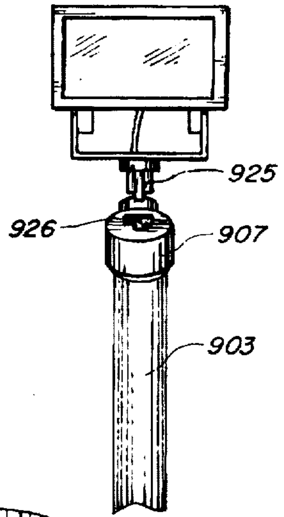
Figure 12C:
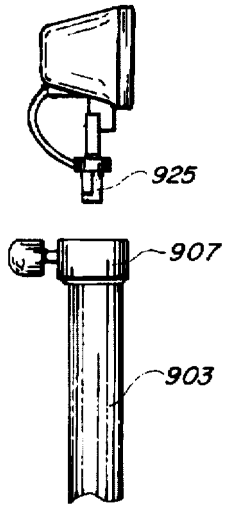

In my FIG. 1, the electrical power for lamp 902 was derived from an exterior plug directly into the receptacle 201. Even if ganged receptacle plug openings are employed, this mode of operation—using exterior wiring plugged into the exterior face of the receptacle—reduces the plug capability for power tools and the like. As shown in FIGS. 12A through 12C, my interior wiring sections for the pole lamp avoids that plug reduction by providing for the wiring of the various sections to be located in the interior of the individual pole sections themselves. Power for lamp 902 may then be supplied by a direct connection through the pole sections and by connection from the bottom of the pole to an interior face of the receptacle in a well known manner. FIG. 4 shows one such manner of connecting a lamp power lead 929 to receptacle 201. FIG. 7 shows an alternative connection for lead 929.

In FIG. 12, the light 902 may either be plugged into a receptacle housed in the collar 907 at the top section 903, FIG. 12A, or it may be fitted with a keyed mounting fixture 925 so that light 902 is both held and powered from the interior of the pole lamp sections. In FIG. 12B and 12C a T-shaped mounting fixture 925 with male and female halves that matingly engage one another are shown.

Figure 13:
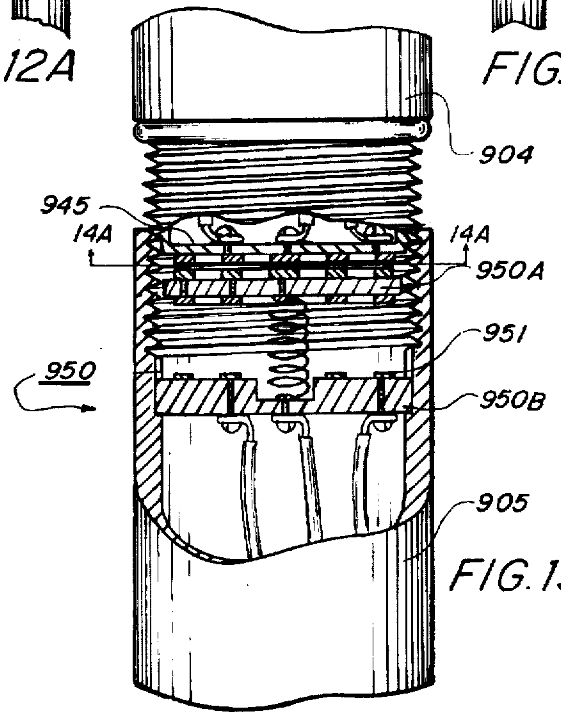
FIG. 13 is a partial cut-away view of a pair of threaded pole sections containing interior wiring for the pole lamp of my invention.

It is the purpose of this invention to eliminate exterior connections to the lamp 902 by employing pole lamp sections that carry wiring and contact plates inside the sections themselves. FIG. 13 depicts such internal electrical continuity being provided from one pole section 903 to 904, 904 to 905, etc. Such continuity is provided when the sections are threaded together by contact plates 945, 950 carried by such pole sections to be joined.

Each section, such as 905, FIG. 13, has a pair of split spring-loaded contacts pads 950 at one end with the upper plate of the pair being a double-sided contact plate. That compressible contact plate pair make electrical contact with a single contact plate 945 carried at the other end of a pole section to which it is to be joined. Since the depicted pole sections 903, 904, 905 may be circular plastic pipe sections, the contact pads/plates may be essentially circular in shape and are adapted to slidably be secured within the interior of pipe sections 904 and 905 as shown, for example, in FIG. 13.

Pole section 904 includes a threaded male end 904A which end includes a single fixed contact pad 945 to which a grounded lead, 946, and positive and negative leads 966 and 977, respectively, are connected by soldering, screws or the like. Each pipe section is like each other in construction and length, and thus such a contact plate 945 is fastened at the male end of each of the individual pole sections.

A threaded female section 905A—and each other female end of other pole sections—includes a pair of dual contact pads 950A and 950B. Each dual pair is spring loaded, and is adapted with a fixed end 950B and a compressible end 950A that slides as the pole sections are joined together. Such joining, as by thread engagement, acts to compress the spring 990 while making contact between plates 950A and 950B when the threaded male and female pole sections are fully threaded together for a completed lamp pole.

In the FIG. 13 presentation, both contact pads 950A and 950B utilize spring 990 as a ground connection and thus electrical ground is present at the upper surface of pad 950A even before the pole sections are threaded together. Using conventional printed circuit technology the screws and electrical connections for such contact plates result in a series of bulls eye circular tracks on the upward facing contact surface 950A.

Figure 14A:
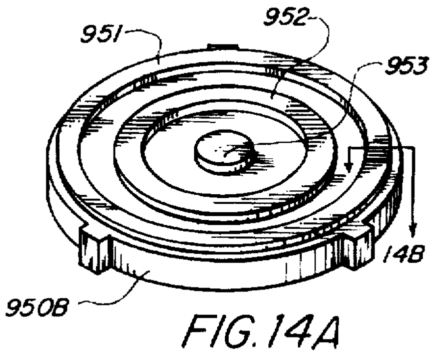
FIG. 14A is a front perspective view of a contact plate useful for the interior wiring connections of my pole lamp sections and FIG. 14B is a cross section of a wave washer as an individual compressible contact track.
Figure 14B:
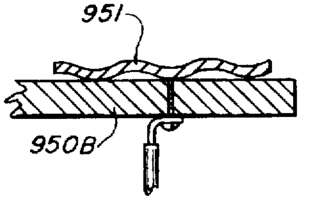
Figure 15:
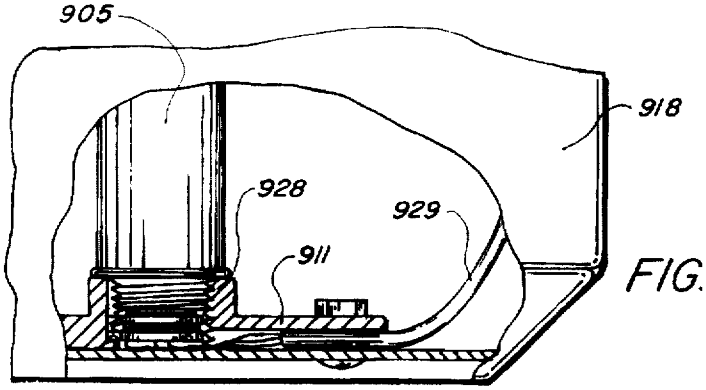
FIG. 15 is a partial cut-away view of the wiring connections at the bottom flange plate for my sectional pole lamp.

FIG. 14 includes FIG. 14A which shows such circular track mating surfaces 951, 952 and 953 where all three connections—ground, positive and negative—are respectively available for electrical contact. Such circular tracks are electrically connected together on opposite sides of an insulative substrate by plated-through holes or other conventional printed circuit connectivity. Such conductivity is indicated diagrammatically by plated through connections in FIG. 13. FIG. 14B shows—in partial cross section—that such individual contact plates 952 may be of the wave washer type in order to allow extra tolerance for spring compression and for good solid electrical contact between the tracks as the pole is assembled.

FIG. 13 shows the mating surfaces of 945 and 950 spaced apart as the two pole sections 904 and 905 are just being joined together. Electrical contact is made between these circular contacts when the two pole sections are being threaded together during assembly of sections 904 and 905 for a completed pole lamp. Contact 950A has three circular tracks 951, 952 and 953 on its upper surface and contact plate 945 has a mating series of circular contacts on its lower surface.

As spring 990 compresses during pole section assembly, these circular tracks 951, 952 and 953 (FIG. 14) come together in electrical contact. Those completed contacts, together with the lower contact plate 945 riding against the completed contact circuit of 950A and 950B, when fully compressed, will complete the inter-connectivity between joining ends of both pole sections 904 and 905. Similar connections are made at each of the other poles sections.

In a similar manner each of the other pole sections when assembled complete a circuit for powering the lamp 902 through all of the assembled pole sections. At the bottom of the container 118 (FIG. 1) or container 918 (FIGS. 16 through 18) another double-sided contact plate has completed the power connections from a GFI 212 or the GFI-protected unit 201 to the bottom contact plate 928 via ground, positive and negative leads within conductor 929.

Conductor 929 may electrically be connected to the connections provided on the GFI-protected receptacle 201 (FIG. 1) or at interiorly-located screw terminals thereon (FIG. 7) in a well known fashion. Plate 928 is similar to plate 950B in structure, whereas the bottom of pole section 905 is similar to plate 945 in keeping with the sameness of each pole section. Such sameness allows the pole sections to be interchanged.

Figure 17A:
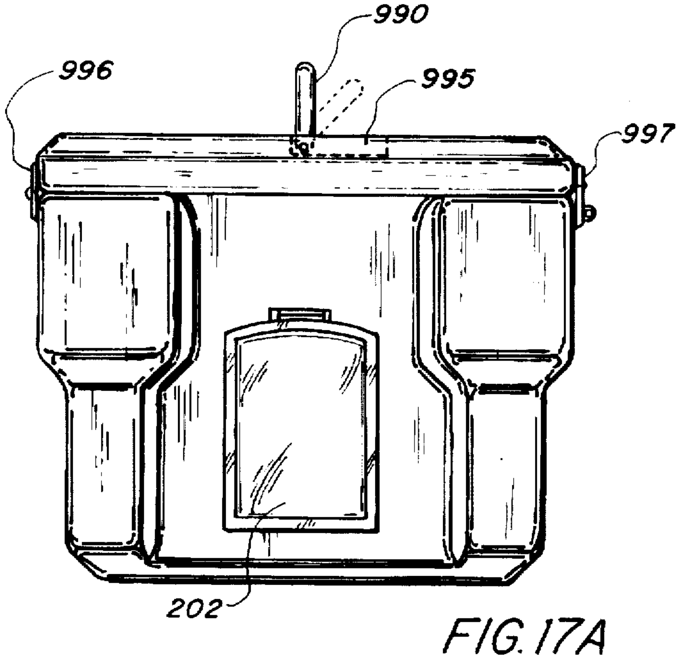
FIG. 17 includes FIGS. 17A and 17B which, respectively, are end and partial side views of a square or rectangular shaped container with alternative rain shield covers and a hinged top with recessed handle.
Figure 17B:
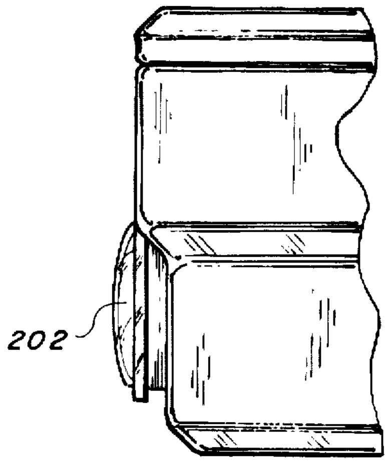
Figure 18:
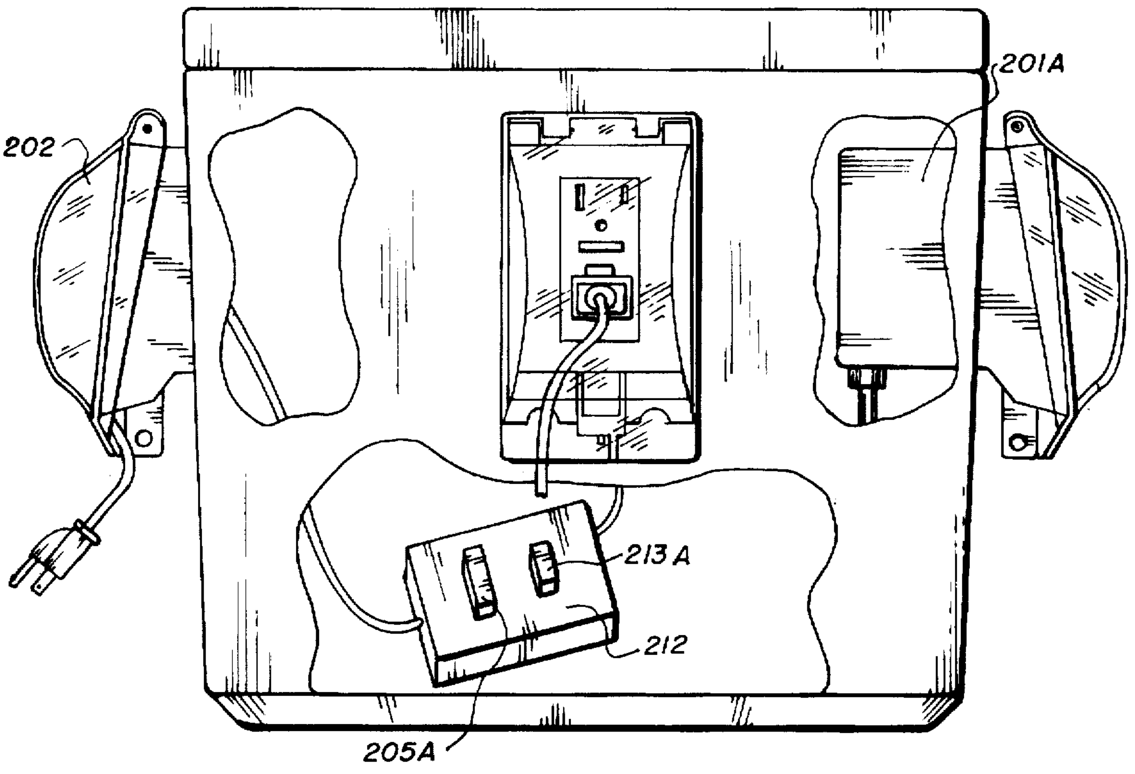
FIG. 18 is a partial cut-away side view of a weathertight container having transparent rain shield with openings for electrical wiring and a GFI-protected receptacle with an internal in-line GFI device and pole lamp.

FIG. 17A, depicts that lid 989 may have a handle 990 normally recessed in a shallow casing indentation 995. Also, any one of several different types of rain shields such as those depicted in FIGS. 16 and 17 are acceptable for use in my invention.

While my invention has been described with reference to a particular example of preferred embodiments, it is my intention to cover all modifications and equivalents within the scope of the following claims. It is therefore requested that the following claims, which define my invention, be given a liberal interpretation which is within the spirit and scope of my contribution to this art.

What is claimed is:

1. An intermediate protective system for supplying GFI-protected power at job sites, said system comprising:

a weathertight container of pail or box shape;

means for receiving electrical power for said intermediate system through a power connection between said weathertight container and an external power source;

a protective ground fault interrupter ("GFI") unit electrically in series with an electrical receptacle carried by said container and having a GFI-protected receptacle face exposable to the exterior of said container;

said GFI-protected receptacle unit receiving electrical power through said power connection, which electrically powered GFI is subject to false power interruptions at the intermediate site when triggered by moisture; and weathertight protective means for protecting said GFI-protected receptacle face from moisture, thereby preventing said false triggering of said GFI-protected receptacle.

2. An intermediate protective system in accordance with claim 1 for supplying power and for supplying a user-installed light at job sites wherein said weathertight container is a tool box which further comprises:

an open top, a bottom and side walls and a weathertight lid covering said top of said tool box;

a storable pole light assembly storable within said tool box;

a weathertight opening in said box for admitting therethrough a GFI-protected electrical connection for powering said light assembly when said pole light is installed by the user;

means including said GFI for powering said installed light from the interior of said container with GFI-protected power delivered by said GFI-protected electrical connection; and additional electrical connection means housed within said pole for supplying GFI-protected electrical power through said assembled pole to said light.

3. An intermediate protective system for supplying power at job sites in accordance with claim 1 and further comprising:

said weathertight container is a tool box for carrying tools, cords and the like to and from said job site; and a length of grounded electrical wire located within the container and extendable beyond said container, said grounded wire having a fixed end electrically hard wired to said GFI-protected receptacle unit and a free end affixed with a plug for connection to said external power source through a weathertight opening in said tool box.

4. A weathertight intermediate protective system in accordance with claim 3 wherein said container is hand portable and said system further comprises:

an opening at the container top with sufficient width across the top opening to allow user access for tools and the like into and out of the normally essentially empty interior of said container; and an open/close weathertight lid covering said opening at the top of said container.

5. A weathertight intermediate protective system in accordance with claim 3 wherein said container further comprises, in combination:

a light and light pole assembly which may easily be assembled/disassembled for user storage in said container when said light is not in use.

6. A weathertight intermediate protective system in accordance with claim 5 and further comprising;

a lamp head for said pole assembly fitted with a unique keyed shape mounting fixture; and means for making suitable electrical contact with the interior of the top pole section for said mounting fixture.

7. A weathertight intermediate protective system in accordance with claim 6 and further comprising;

said keyed shape is essentially a male "T" shape when viewed in cross section; and said male T shape sits against a grounded plug bottom in a mating T-shaped female socket located at the top of said light pole assembly in order to supply the requisite electrical power from said intermediate power system to said light.

8. A weathertight intermediate protective system in accordance with claim 1 and including a storable light for said container, and said system further comprises, in combination:

an upright light pole assembled from a series of sectional pole lengths, with each pole section selected at a length that fits within the container for portability therein; and electrical connection means housed within said sectional lengths for supplying power through said assembled pole to said light.

9. A weathertight intermediate protective system in accordance with claim 8 wherein said container is a tool box, said light is storable within said tool box and said protective system further comprises:

a weathertight lid for said container;

a top opening in said weathertight lid for receiving said pole lengths when assembled through said opening;

and weathertight means for securing said assembled light pole through said top opening in said weathertight lid.

10. A weathertight intermediate protective system unit in accordance with claim 9 wherein said container further comprises:

a horizontal interior bottom wall of said container;

pedestal means for fastening said assembled light pole to said interior bottom wall of said container; and said weathertight means includes gasket means for sealing said light pole at the opening through which said assembled pole extends.

11. A weathertight intermediate protective system in accordance with claim 10 wherein said series of light pole sections further comprises:

mechanical connection means for connecting each light pole section to another light pole section; and means for securely coupling said sections together in order to form said assembled light pole.

12. A weathertight intermediate protective system in accordance with claim 11 wherein said light pole sections further comprise:

equal length sections of hollow tubing; and electrical connection means located within the hollow interior of each section and adapted at the ends of each section to join electrically with another one of said sections when said sections are adjoined and coupled together.

13. A weathertight intermediate protective unit in accordance with claim 12 wherein said sections further comprise:

male and female mated threads respectively located, one at each end of said sections forming said light pole; and a spring loaded compressible pair of electrical contact plates within each section which allows said respective male and female threaded ends of two sections to be threaded together while completing an electrical circuit from section to section through said adjoining sections.

14. A weathertight intermediate protective system in accordance with claim 13 wherein said sections are lengths of plastic pipe which tend to bind when assembled/disassembled by hand by a user, and further comprising:

anti-seize O-rings positioned between each section of said light pole in order to overcome the tendency of said sections to bind together when assembled.

15. A weathertight intermediate protective system in accordance with claim 12 wherein each of said pole sections have a first and a second end, said electrical connection means in said sections comprises more than two separate electrical connections, and said system further comprises:

a pair of compressible electrical contact plates secured at one end of a pole section with one electrical connection permanently established from plate to plate when in an non-compressed condition; and said remaining electrical connections at said one end of said pole section being established from plate to plate when said contact plate pair is in a fully compressed condition upon assembly of said one section into said assembled light pole.

16. A weathertight intermediate protective system in accordance with claim 15 wherein each of said pole sections have a first and a second end and said interior electrical connection means within said pole sections comprises three separate connections, said system further comprising:

said remaining two connections of said plate pair being formed as mating compressible circular electrical contact tracks which face each other and which are brought together into electrical contact when said plates of said pair are compressed together as adjoining pole sections are assembled for a completed light pole.

17. A weathertight intermediate protective system in accordance with claim 16 wherein each of said pole sections have a first and a second end and said remaining two connections of said plate pair further comprise:

a double-sided contact plate on opposite sides of an insulative substrate, with said double-sided plate being located at the outward facing one of said plate pair, with both inwardly facing and outwardly facing sides of said outer plate being in the form of circular contact tracks; and means electrically connecting both sides of said double-sided contact plate electrically together through said insulative substrate.

18. A weathertight intermediate protective system in accordance with claim 15 wherein said permanent electrical connection in each of said contact plate pair comprises:

an electrically conductive spring connecting both of said plates in said pair together electrically while mechanically holding said plates of said pair apart for compression and electrical closing of said contacts when said spring is compressed.

19. A weathertight intermediate protective system in accordance with claim 15 wherein said permanent electrical connection in each of said contact plate pairs comprises:

circular wave washer contact plates which are individually compressible as said adjoining pole sections are fully assembled for said light pole.

20. A method of providing safety to electrical power users at an intermediate site by a combination side-walled and electrical shock protective unit with a self contained light, with the method comprising the steps of:

fixably mounting a GFI-protected receptacle unit so that tools other than said light may be plugged into a plug-receiving face of the receptacle exposed at the exterior surface of a weathertight container;

sealing the exposed face of the GFI-protected receptacle in a weathertight seal on the exterior of the protective unit;

installing within the unit a length of electrical wire which has said GFI unit in line with said light; and energizing said light by GFI-protected power supplied from the interior of said unit by said GFI.

* * * * *